US012562830B2

(12) United States Patent
Jones et al.

(10) Patent No.: US 12,562,830 B2
(45) Date of Patent: Feb. 24, 2026

(54) SYSTEM AND METHOD FOR PROVIDING RADIO CONTENT TO A VEHICLE USING AN ENHANCED AM RADIO ACCESS SYSTEM

(71) Applicant: Ford Global Technologies, LLC, Dearborn, MI (US)

(72) Inventors: Matthew Jones, Beaverton, OR (US); Oliver Lei, Windsor (CA); Joshua Wheeler, Trenton, MI (US); David Richard Tengler, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 18/474,604

(22) Filed: Sep. 26, 2023

(65) Prior Publication Data

US 2025/0105936 A1 Mar. 27, 2025

(51) Int. Cl.
*H04H 20/36* (2008.01)
*H04H 20/62* (2008.01)

(52) U.S. Cl.
CPC ............ *H04H 20/36* (2013.01); *H04H 20/62* (2013.01); *H04H 2201/186* (2013.01)

(58) Field of Classification Search
None
See application file for complete search history.

(56) References Cited

U.S. PATENT DOCUMENTS 5,604,503 A * 2/1997 Fowler .................. G01S 13/003 342/194
5,673,292 A * 9/1997 Carlin .................... H04H 20/36 332/151
6,112,063 A * 8/2000 Ravi ..................... H03J 1/0058 455/45

(Continued)

FOREIGN PATENT DOCUMENTS

CN 1212387 A * 3/1999 ............ H03J 1/0066
CN 1449542 A * 10/2003 ....... G06K 19/07743

(Continued)

*Primary Examiner* — Berhanu Tadese

(74) *Attorney, Agent, or Firm* — Joseph Zane; Brooks Kushman, P.C.

(57) ABSTRACT

A system, for providing radio content to a vehicle, includes a vehicle communication system, a vehicle infotainment system, and a vehicle entertainment support server remote from the vehicle. The vehicle communication system includes a tuner unresponsive to a first radio transmission medium and is configured to transmit a radio content request requesting radio content from an identified radio station (i.e., a desired radio station). The vehicle infotainment system configured to obtain an input identifying the desired radio station broadcasting in the first radio transmission medium and emit radio content from the desired radio station. The vehicle entertainment support server remote is configured to: receive radio content from a source, store the radio content in a selected staging memory; obtain the radio content request; and transmit the radio content in the selected staging memory in response to the transmitting radio station being the desired radio station in radio content request.

18 Claims, 4 Drawing Sheets

(56) References Cited

U.S. PATENT DOCUMENTS

| | | | | |
|---|---|---|---|---|
| 6,463,469 | B1 * | 10/2002 | Yavitz | H04H 20/34 709/219 |
| 7,116,939 | B1 * | 10/2006 | Kandler | H04B 1/082 455/414.3 |
| 7,162,208 | B2 * | 1/2007 | Hendricksen | H04H 40/18 455/161.2 |
| 7,177,589 | B1 * | 2/2007 | Lynch | H04H 20/62 701/1 |
| 7,610,011 | B2 * | 10/2009 | Albrett | H04N 7/17318 455/3.04 |
| 8,391,914 | B2 * | 3/2013 | Furuya | H04H 60/43 375/310 |
| 8,577,315 | B2 * | 11/2013 | Anzures | H04H 20/22 455/154.2 |
| 8,666,089 | B2 * | 3/2014 | Elkins | H04H 20/26 381/86 |
| 8,670,393 | B2 * | 3/2014 | Jain | H04H 60/91 455/550.1 |
| 9,002,885 | B2 * | 4/2015 | Merrifield | A63F 13/54 463/32 |
| 9,031,499 | B2 | 5/2015 | Pandey et al. | |
| 9,166,716 | B2 * | 10/2015 | Lau | H04H 60/82 |
| 9,300,413 | B2 * | 3/2016 | Jaisimha | H04H 60/31 |
| 9,531,487 | B2 * | 12/2016 | Jaisimha | H04H 40/27 |
| 9,706,038 | B1 * | 7/2017 | Dow | H04H 20/57 |
| 9,762,339 | B2 * | 9/2017 | Williams | H04H 60/41 |
| 9,800,360 | B2 * | 10/2017 | Yamada | H04H 60/80 |
| 9,986,401 | B2 * | 5/2018 | El-Dinary | H04H 20/62 |
| 10,355,795 | B2 | 7/2019 | Rao et al. | |
| 10,707,980 | B2 * | 7/2020 | Littlejohn | G06Q 30/0271 |
| 10,932,011 | B2 * | 2/2021 | Littlejohn | H04N 21/4622 |
| 11,108,480 | B2 * | 8/2021 | Littlejohn | H04B 1/082 |
| 11,108,482 | B2 | 8/2021 | Ellis et al. | |
| 11,303,371 | B2 | 4/2022 | Moebius | |
| 11,373,215 | B2 * | 6/2022 | Littlejohn | G06Q 30/0271 |
| 11,452,032 | B2 * | 9/2022 | Gupta | H04W 48/10 |
| 11,653,292 | B2 * | 5/2023 | Azizi | H04L 67/51 370/329 |
| 11,659,256 | B2 * | 5/2023 | Littlejohn | H04N 21/8358 725/32 |
| 11,706,044 | B2 * | 7/2023 | Christensen | G06Q 20/20 370/312 |
| 11,776,534 | B1 * | 10/2023 | Kulakarni | G10L 15/1815 704/257 |
| 11,784,861 | B2 * | 10/2023 | Aldana | H04L 27/2607 370/336 |
| 11,800,439 | B2 * | 10/2023 | Azizi | H04W 92/045 |
| 12,010,053 | B2 * | 6/2024 | Khoryaev | H04L 27/2613 |
| 12,028,161 | B2 * | 7/2024 | Miao | H04L 1/08 |
| 12,035,241 | B2 * | 7/2024 | Islam | H04W 72/542 |
| 12,081,485 | B2 * | 9/2024 | Zhou | H04W 72/1268 |
| 12,127,103 | B2 * | 10/2024 | Azizi | H04W 4/46 |
| 12,127,289 | B2 * | 10/2024 | Yamine | H04W 48/12 |
| 12,211,071 | B2 * | 1/2025 | Littlejohn | H04L 67/02 |
| 12,245,139 | B2 * | 3/2025 | Guo | H04W 8/24 |
| 2003/0040272 | A1 * | 2/2003 | Lelievre | H04H 60/51 455/3.06 |
| 2004/0198279 | A1 * | 10/2004 | Anttila | H04H 60/85 455/179.1 |
| 2007/0124779 | A1 * | 5/2007 | Casey | H04N 7/17318 348/E7.071 |
| 2008/0077679 | A1 * | 3/2008 | Bawany | G06F 16/4387 709/231 |
| 2009/0117844 | A1 * | 5/2009 | Furuya | H04H 60/43 455/3.01 |
| 2009/0124264 | A1 * | 5/2009 | Su | H04M 1/72403 455/552.1 |
| 2013/0156130 | A1 * | 6/2013 | Elkins | H04H 20/26 375/316 |
| 2014/0080405 | A1 * | 3/2014 | Nikhil | H04H 20/86 455/3.01 |
| 2015/0381297 | A1 * | 12/2015 | Cepuran | H04H 60/15 455/352 |
| 2016/0105249 | A1 * | 4/2016 | Jain | H04H 60/13 455/3.01 |
| 2016/0329977 | A1 * | 11/2016 | Williams | H04W 36/305 |
| 2017/0010853 | A1 * | 1/2017 | Gelles | G06F 3/165 |
| 2017/0070303 | A1 * | 3/2017 | Jaisimha | H04H 60/31 |
| 2017/0201874 | A1 * | 7/2017 | Dow | H04H 60/46 |
| 2019/0364492 | A1 * | 11/2019 | Azizi | H04L 67/12 |
| 2020/0205062 | A1 * | 6/2020 | Azizi | H04W 36/0009 |
| 2021/0058970 | A1 * | 2/2021 | Kwak | H04W 72/23 |
| 2021/0258646 | A1 * | 8/2021 | Vagelos | H04N 21/4314 |
| 2022/0284481 | A1 * | 9/2022 | Littlejohn | H04B 1/082 |
| 2023/0138578 | A1 * | 5/2023 | Azizi | H04B 17/3913 370/329 |
| 2023/0247269 | A1 * | 8/2023 | Littlejohn | H04N 21/6112 725/32 |
| 2023/0300288 | A1 * | 9/2023 | Gaxiola-Sosa | H04N 21/4263 455/150.1 |
| 2024/0073796 | A1 * | 2/2024 | Azizi | H04W 92/045 |
| 2024/0214094 | A1 * | 6/2024 | Pahuja | H04H 60/51 |
| 2025/0105936 | A1 * | 3/2025 | Jones | H04H 20/36 |

FOREIGN PATENT DOCUMENTS

| | | | | | |
|---|---|---|---|---|---|
| CN | 1192287 | C | * | 3/2005 | H03J 1/0066 |
| CN | 101655903 | A | * | 2/2010 | G06K 19/07743 |
| CN | 101978623 | B | * | 11/2013 | H04N 21/4126 |
| CN | 105490766 | A | * | 4/2016 | H04H 20/86 |
| CN | 105812078 | A | * | 7/2016 | H04H 20/88 |
| CN | 108206995 | A | * | 6/2018 | H04W 4/00 |
| CN | 109450580 | A | * | 3/2019 | H04H 20/62 |
| CN | 112369106 | A | * | 2/2021 | H04W 74/002 |
| CN | 110301143 | B | * | 4/2022 | H04W 4/70 |
| CN | 119767265 | A | * | 4/2025 | H04H 20/62 |
| DE | 112017006689 | T5 | * | 9/2019 | H04W 52/0264 |
| EP | 0813302 | A1 | * | 12/1997 | H04N 5/50 |
| EP | 2008384 | B1 | * | 5/2018 | H04H 60/13 |
| EP | 4274287 | A2 | * | 11/2023 | H04W 16/14 |
| EP | 4418713 | A1 | * | 8/2024 | H04W 72/02 |
| EP | 3925154 | B1 | * | 9/2024 | H04W 72/23 |
| EP | 4482074 | A2 | * | 12/2024 | H04W 72/23 |
| EP | 4000192 | B1 | * | 4/2025 | H04H 60/82 |
| FR | 2863807 | A1 | * | 6/2005 | G07B 15/02 |
| FR | 3009661 | A1 | * | 2/2015 | H04N 21/4126 |
| JP | H06177931 | A | * | 6/1994 | |
| JP | 2737959 | B2 | * | 4/1998 | |
| JP | H10341175 | A | * | 12/1998 | H03J 1/0066 |
| JP | 2855624 | B2 | * | 2/1999 | |
| JP | 2006313972 | A | * | 11/2006 | H04H 20/106 |
| JP | 2015149709 | A | * | 8/2015 | H04H 60/80 |
| JP | 2016213696 | A | * | 12/2016 | |
| JP | 2023058266 | A | * | 4/2023 | H04W 72/02 |
| KR | 100490258 | B1 | * | 5/2005 | H04B 1/16 |
| KR | 100559323 | B1 | * | 3/2006 | H04H 20/72 |
| KR | 20080111554 | A | * | 12/2008 | H04H 20/86 |
| KR | 100994661 | B1 | * | 11/2010 | H04H 60/91 |
| KR | 20170053450 | A | * | 5/2017 | H04N 21/4821 |
| KR | 20220140357 | A | * | 10/2022 | H03J 7/183 |
| KR | 20230009517 | A | * | 1/2023 | H04W 28/0236 |
| KR | 102622783 | B1 | * | 1/2024 | H04W 52/0261 |
| KR | 102715376 | B1 | * | 10/2024 | H04W 52/0261 |
| KR | 20240148966 | A | * | 10/2024 | H04W 52/0261 |
| MA | 20150299 | A1 | * | 8/2015 | |
| WO | WO-2007124441 | A2 | * | 11/2007 | H04H 60/91 |
| WO | WO-2008039368 | A1 | * | 4/2008 | G06F 16/4387 |
| WO | WO-2008050170 | A1 | * | 5/2008 | H04H 20/26 |
| WO | WO-2014120634 | A1 | * | 8/2014 | H04H 60/51 |
| WO | WO-2017011472 | A1 | * | 1/2017 | H04H 60/27 |
| WO | WO-2018082682 | A1 | * | 5/2018 | H04L 5/0094 |
| WO | WO-2018125686 | A2 | * | 7/2018 | H04W 52/0264 |
| WO | WO-2023063181 | A1 | * | 4/2023 | H04W 72/02 |

* cited by examiner

SYSTEM AND METHOD FOR PROVIDING RADIO CONTENT TO A VEHICLE USING AN ENHANCED AM RADIO ACCESS SYSTEM

TECHNICAL FIELD

The present disclosure relates to a vehicle infotainment system providing radio content and more specifically, to a vehicle infotainment system for an electric vehicle.

BACKGROUND

The statements in this section merely provide background information related to the present disclosure and may not constitute prior art.

Vehicle infotainment systems provide users with various audio options such as radio content from radio stations broadcasting in amplitude modulated (AM) frequencies and frequency modulated (FM) frequencies. The radio content from the radio stations is generally received via an AM tuner and a FM tuner.

SUMMARY

This section provides a general summary of the disclosure and is not a comprehensive disclosure of its full scope or all of its features.

In one form, the present disclosure is directed to a system for providing radio content to a vehicle, and includes a vehicle communication system, a vehicle infotainment system, and a vehicle entertainment support server remote from the vehicle. The vehicle communication system includes at least one tuner, where the at least one tuner is unresponsive to a first radio transmission medium and is configured to transmit a radio content request requesting radio content from an identified radio station. The vehicle infotainment system includes one or more processors and a memory storing programming instructions that are configured to cause the one or more processors to: obtain an input identifying a desired radio station broadcasting in the first radio transmission medium, and emit radio content from the desired radio station. The identified radio station of the radio content request is the desired radio station The vehicle entertainment support server remote from the vehicle and including one or more staging memories. The vehicle entertainment support server being configured to: receive radio content from a source, wherein the radio content is originally broadcasted in the first radio transmission medium by a transmitting radio station; store the radio content in a selected staging memory from among the one or more staging memories; obtain the radio content request; and transmit the radio content in the selected staging memory in response to the transmitting radio station being the desired radio station in radio content request.

In one form, the present disclosure is directed to a method for providing radio content to a vehicle. The method includes: obtaining, by a vehicle infotainment system at a vehicle, an input identifying a desired radio station broadcasting in a first radio transmission medium; transmitting, by a vehicle communication system of the vehicle, a radio content request requesting radio content from the desired radio station, where the vehicle communication system includes at least one tuner, and the at least one tuner is unresponsive to the first radio transmission medium; obtaining, by a vehicle entertainment support server remote from the vehicle, the radio content request; obtaining, by the vehicle entertainment support server, radio content from a source, wherein the radio content is originally broadcasted in the first radio transmission medium by a transmitting radio station; storing, by the vehicle entertainment support server, the radio content obtained in a selected staging memory from among one or more staging memories, wherein the vehicle entertainment support server includes the one or more staging memories; transmitting, by the vehicle entertainment support server, the radio content in the selected staging memory in response to the transmitting radio station being the desired radio station in radio content request; and playing, by the vehicle infotainment system, the radio content received from the vehicle entertainment support server.

In one form, the present disclosure is directed to a system for providing radio content to a vehicle. The system includes a vehicle communication system, a vehicle infotainment system, and a vehicle entertainment support server remote from the vehicle. The vehicle communication system includes at least one tuner, where each tuner is unresponsive to radio transmission provided in amplitude modulation (AM) radio frequency band and is configured to transmit a radio content request requesting radio content from an identified radio station. The vehicle infotainment system includes one or more processors and a memory storing programming instructions that are configured to cause the one or more processors to obtain an input identifying a desired radio station broadcasting in the AM frequency band, where the identified radio station of the radio content request is the desired radio station. The vehicle entertainment support server includes one or more staging memories, is configured to: receive radio content from a source, wherein the radio content is originally broadcasted in the AM frequency band by a transmitting radio station; store the radio content in a selected staging memory from among the one or more staging memories; obtain the radio content request from the vehicle communication system; determine that the desired radio station matches the transmitting radio station; and transmit the radio content in the selected staging memory to the vehicle communication system of the vehicle. The instructions further cause the one or more processors of the vehicle infotainment system to play radio content received from the vehicle entertainment support server.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

As required, detailed embodiments are disclosed herein; however, it is to be understood that the disclosed embodiments are merely examples that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The number of electric vehicles on the road is on the rise. However, components of the electric vehicles, such as the electric motors, may interfere with selected radio transmission mediums, such as amplitude modulated (AM) frequencies, causing reception quality in the radio content being received in the AM frequencies. In lieu of an AM radio tuner, the present disclosure outlines a system in which a vehicle obtains radio content from a desired AM radio station without the use of an AM tuner and instead, employs a vehicle entertainment support (VES) server and a digital AM radio module provided with an infotainment system of the vehicle. As detailed below, VES server and the vehicle are in communication using various types of wireless communication protocols such as, but not limited cellular, Wi-Fi, and/or vehicle-to-everything (V2X) communication. The VES server obtains radio content broadcasted by an AM radio station from various sources, and transmits the radio content to the vehicle having the digital AM radio module, thereby providing single AM radio access to the vehicle not having the AM tuner.

Figure 1:
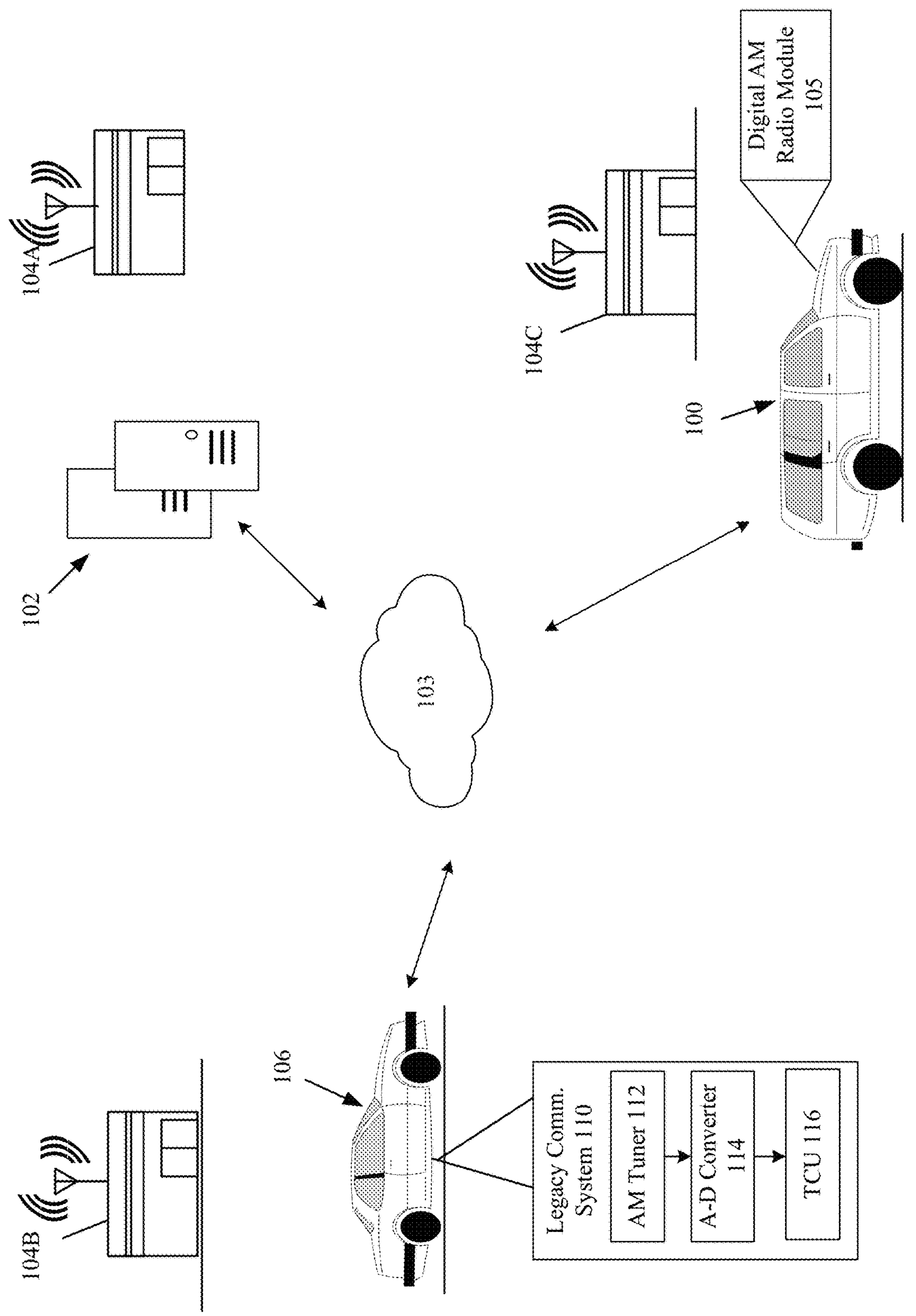
FIG. 1 illustrates a vehicle entertainment support (VES) server and a vehicle system having a digital amplitude modulated (AM) radio module in accordance with the present disclosure.

Referring to FIG. 1, in one form, a vehicle system 100 is configured to obtain radio content from a vehicle entertainment support (VES) server 102, where the radio content is in a radio transmission medium unreceivable by the vehicle system 100. In a non-limiting example, the vehicle system 100 is an electric vehicle and does not include appropriate tuners/receivers for receiving radio content transmitted in, as a radio transmission medium, AM frequency bands. Without the requisite tuner, the vehicle system 100 is unable to directly receive radio content from one or more AM radio stations 104A, 104B, 104C (collectively "radio stations 104").

As described herein, the vehicle system 100 includes a digital AM radio module 105 configured to identify a desired AM radio station and obtain radio content emitted by the desired AM radio station via the VES server 102. The vehicle system 100 having the digital AM radio module 105 may be referred to as an enhanced vehicle system 100.

In FIG. 1, a wireless communication network 103 is utilized by the enhanced vehicle system 100, the VES server 102, and other devices (e.g., the radio station 104 and a legacy vehicle system 106) to communication with external devices/systems. In a non-limiting example, the wireless communication network 103 provides one or more wireless communication links supported by various protocols, such as but not limited to: cellular, Wi-Fi, vehicle-to-everything (V2X) communication, infrastructure-to-everything (I2X) communication, transmission control protocol (TCP), user datagram protocol (UDP), and/or satellite communication.

In one form, the VES server 102 is a cloud-based server remote from the enhanced vehicle system 100 and is configured to receive radio content provided in the AM frequency band and transmit the radio content to the enhanced vehicle system 100. Radio content provided in the AM radio frequency band may be provided to the VES server 102 by various sources, such as, but not limited to, the AM radio stations 104 and/or a legacy vehicle system 106. In a non-limiting example, the VES server 102 receives radio content from a radio station 104 that is within a reception range of the VES server 102 (e.g., radio station 104A in FIG. 1). The radio signal is an analog radio signal broadcasted at an assigned AM frequency band. Alternatively or in addition to the broadcasted radio signal, the VES server 102 is configured to obtain digital files of the radio content from the radio station 104 if the digital files are available. The digital files may be obtained in various suitable ways, such as, but not limited to, cloud-based database that is managed by the radio station 104.

In addition to or in lieu of the radio stations 104, the VES server 102 is configured to receive the radio content from the legacy vehicle system 106 that is configured to receive radio content broadcasted in the AM frequency band. In a non-limiting example, the legacy vehicle system 106 and the VES server 102 are in communication via V2X and I2X standards using a cellular network.

In one form, the legacy vehicle system 106 includes a legacy communication (Comm.) system 110 having an AM tuner 112, an analog-to-digital (A-D) converter 114, and a telematic control unit (TCU) 116. The AM tuner 112 is configured to receive radio content in the AM radio frequency band, and specifically, from an AM radio frequency selected by a user of the legacy vehicle system 106. Stated differently, the user of the vehicle tunes to a selected AM frequency employing one or more interfaces provided with an infotainment system of the vehicle system 106, such as but not limited to, buttons, dials, voice command, among others. The AM tuner 112 then obtains the radio content broadcasted at the selected AM frequency band.

In one form, the analog radio signal received by the AM tuner 112 at the selected AM frequency is transmitted to the VES server 102 as a digital file/message. Specifically, the A-D converter 114, which may also be referred to as a digital audio converter (DAC), is configured to convert the analog radio signal to a digital file.

In one form, the TCU 116 transmits a message having the digital file to the VES server 102. In a non-limiting example, the TCU 116 includes hardware and software components to establish communication with the VES server 102 under V2X standard, and then generates and transmits the message using V2X standards. The message may also include other information, such as but not limited to: location of the legacy vehicle system 107, identification information of the radio station 104, time stamp having a data and time of the radio content. In one form, the TCU 116 includes a global navigation satellite system (GNSS) antenna, and a computing device configured to execute protocols related to V2X standards.

Accordingly, if the user of the legacy vehicle system 106 receives radio content from an AM radio station 104 within a reception range of the vehicle system 106 (e.g., the radio station 104B) via the AM tuner 112, the legacy vehicle system 106 may transmit the radio content to the VES server 102. In one form, the VES server 102 transmits a message requesting radio content from an identified radio station. The legacy vehicle system 106 then determines whether the AM tuner 112 is tuned to an AM frequency associated with identified radio station. If so, the legacy vehicle system routinely transmits the message having the digital file to the VES server 102 until, for example, the AM tuner 112 is no longer tuned to the identified radio station, the legacy vehicle system 106 is turned off, and/or the VES server 102 transmits a message indicating the radio content for the identified radio station is no longer needed. It should be readily understood the VES server 102 is able to receive radio content from multiple legacy vehicle systems 106 for multiple identified stations. Accordingly, multiple legacy vehicle systems 106 may feed the same and/or different AM radio content at a time.

In some variations, the VES server may also receive radio content from other sources, such as but not limited to, sources providing digital audio or television content (e.g., digital content supported by Advanced Television System Committee (ATSC) standards).

Figure 2:
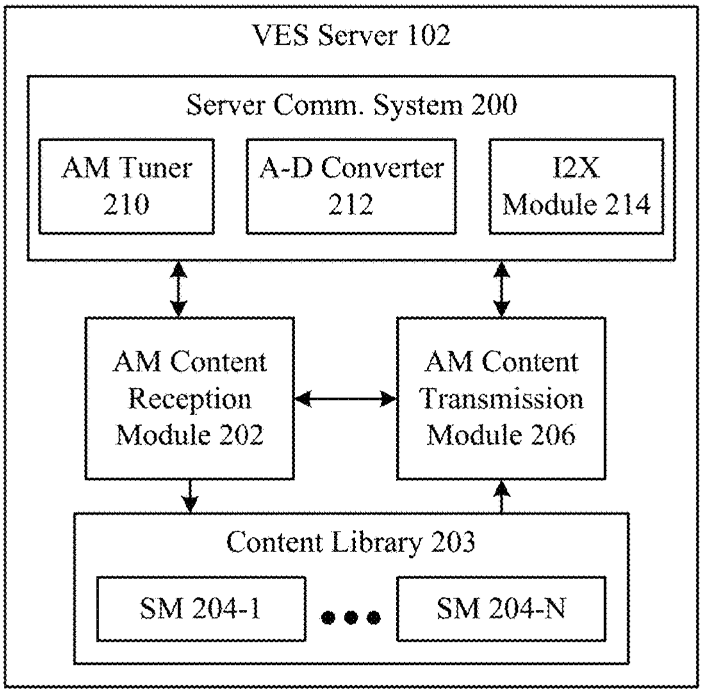
FIG. 2 is an example block diagram of the VES server of FIG. 1 in accordance with the present disclosure.

In one form, referring to FIG. 2, the VES server 102 is configured to include a server communication (Comm.) system 200, an AM content reception module 202, a content library 203 having one or more staging memory (SM) 204-1 to 204-N (collectively "staging memory 204"), and an AM content transmission module 206.

In one form, the server communication system 200 is configured to communicate with other devices/systems via the wireless communication network 103. In a non-limiting example, the server communication system 200 may include an AM tuner 210 for receiving radio content broadcasted in the AM frequency band, an A-D converter 212, and an I2X module 214. Similar to A-D converter 114, the A-D converter 212 converts an analog signal to a digital file.

The I2X module 214 is configured to exchange data with other devices, such as the legacy vehicle system 106, the enhanced vehicle system 100, and/or roadside devices (not shown), using the V2X/I2X standard. It should be readily understood that the server communication system 200 may include other known components, such as, but not limited to processors, transceivers, and modems, to establish communication with external devices and perform the operations described herein.

In one form, the AM content reception module 202 is configured to receive radio content from one or more sources, such as, the AM radio stations 104 and/or the legacy vehicle system(s) 106. The AM content reception module 202 is configured to store the radio content in the content library 203 and more specifically, selects a staging memory 204 from among the one or more staging memories 204 of the content library 203 to temporarily store the radio content prior to transmitting the radio content to the enhanced vehicle system 100. In a non-limiting example, the staging memory is provided as one or more caches.

The AM content reception module 202 is configured to manage the radio content being received by storing information such as, but not limited to: the AM frequency associated with the radio content; identification information related to the source of the radio content received (identification information of the radio station 104 and/or of the legacy vehicle system 106; and/or the location of the source providing the radio content. Accordingly, the AM content reception module 202 is configured to receive a plurality of radio content broadcasted from a plurality of radio stations, and store the plurality of radio content in the content library 203 (e.g., in at least one staging memory 204). The AM content reception module 202 may further provide a list of available AM radio frequencies (i.e., available radio content), which is shared with the enhanced vehicle system 100.

In one form, the AM content reception module 202 receives the same radio content from multiple sources (e.g., multiple legacy vehicle systems 106; a legacy vehicle system 106 and a radio station 104), and selects the radio content to be stored from among the sources based on one or more qualifiers. In a nonlimiting example, the one or more qualifiers include quality of the radio content and/or latency of the radio content. In addition, the AM content reception module 202 may switch between the different sources such that if the radio content from a first source is selected to be stored, the AM content reception module 202 may switch to another source if, for example, the quality of the radio content from the first source degrades.

In one form, the AM content transmission module 206 is configured review a radio content request from the enhanced vehicle system 100 and provide the radio content, if available, to the server comm. system 200 for transmission to the enhanced vehicle system 100. Using the identified radio station and location of the enhanced vehicle system 100 provided in the request, the AM content transmission module 206 determines if the content library 206 includes radio content from the identified radio station. If the radio content is available, the AM content transmission module 206 acquires the radio content from an associated staging memory storing the radio content, and transmits the radio content to the enhanced vehicle system 100 via the server communication system 200.

If the AM content transmission module 206 is not available, the AM content transmission module 206 generates a notification indicating the radio content is unavailable and transmits the notification to the enhanced vehicle system 100. In another variation, the AM content transmission module 206 may broadcast a message to one or more legacy vehicle systems 106 in communication with the VES server 102 to request the radio content for the identified radio station if the legacy vehicle system 106 is tuned to the same radio station. If no response is received within a desired time period, the VES server 102 transmits the notification regarding the unavailable radio content to the enhanced vehicle system 100.

Figure 3:
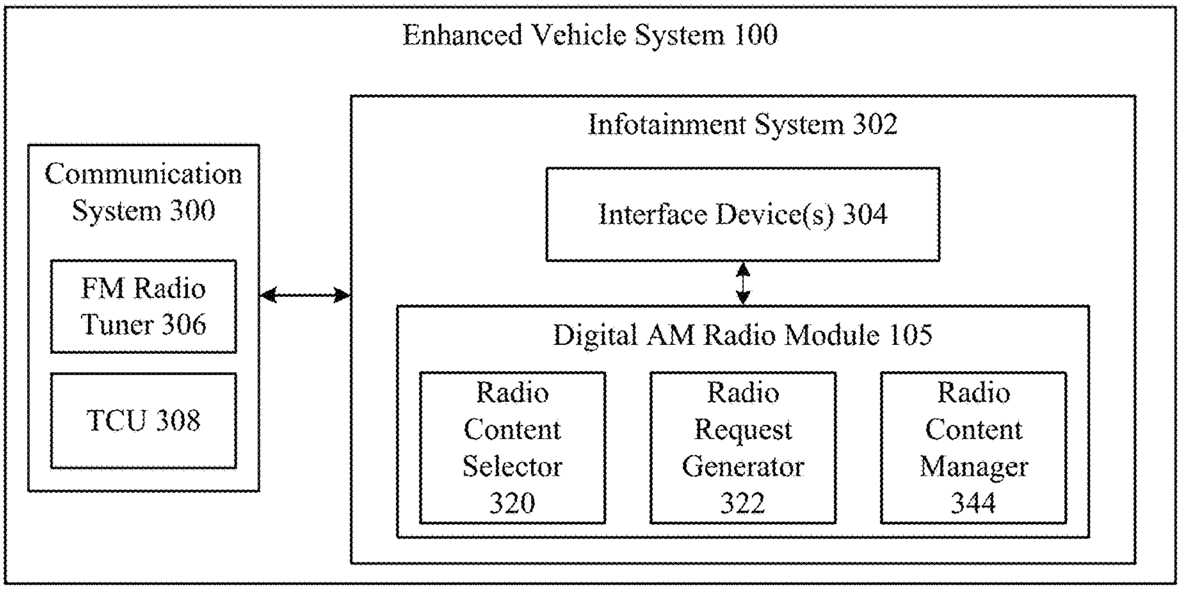
FIG. 3 is an example block diagram of the vehicle system having the digital AM radio module of FIG. 1 in accordance with the present disclosure.

Referring to FIG. 3, among other components, the enhanced vehicle system 100 includes a communication system 300 and an infotainment system 302 including one or more interface devices 304 and the digital AM radio module 105. Similar to the legacy communication system 110, the communication system 300 is configured to communicate with various external devices/systems, such as, but not limited to the VES server 102 and a legacy vehicle system 106 that is within communication range of the enhanced vehicle system 100.

In one form, among other components, the communication system 300 includes a frequency modulated (FM) radio tuner 306 to obtain radio content in the FM frequency band and a TCU 308. The TCU 308 operates in a similar manner as the TCU 116 of the legacy vehicle system 106, thus the details of TCU 308 is omitted for purpose of brevity. The communication system 300 also includes other components such as, but not limited to, processors, transceivers, and modems, to establish communication with external devices/systems. In some variations, the communication system 300 may not include the FM radio tuner 306.

The infotainment system 302 is configured to provide information and vehicle entertainment options, such as, but not limited to, radio content to the user of the enhanced vehicle system 100. In one form, the interface devices 304 are provided to relay information to the user and to receive inputs from the user. In a non-limiting example, the interface devices 304 may include audio devices (e.g., speaker and/or microphone), display device (e.g., a head-up display and/or a liquid crystal display with touchscreen), and/or buttons/knobs.

The digital AM radio module 105 is configured to provide the user AM radio content without the use of an AM radio tuner 112. Specifically, the communication system 300 generally includes at least one tuner (e.g., FM tuner, cellular receiver, and/or GNSS receiver, among others). However, a tuner is not provided for a designated radio transmission medium, such as an AM tuner for receiving the AM frequency band. Therefore, the communication system 300 is unresponsive or, in other words, unable to receive radio content in the designated radio transmission medium. The digital AM radio module 105 is configured to provide access to the radio content transmitted in the AM frequency band by requesting the radio content for an identified radio station from the VES server 102.

In one form, the digital AM radio module 105 includes a radio content selector 320, a radio request generator 322, and a radio content manager 344. The radio content selector 320 is configured to obtain an input from the user identifying a desired radio station in the AM frequency band. In non-limiting example, the AM radio content selector 320 is configured to: using the location of the enhanced vehicle system 100, provide available local radio stations 104 within a reception range of the enhanced vehicle system 100 (e.g., the radio station 104C); provide available radio stations 104 broadcasting to a selected location provided by the user, such as a home location, destination location, or other specified location; and/or provide information indicative of the list of available radio content from various radio stations being received by the VES server 102. The AM radio content selector 320 may employ one or more of the interface devices 304, such as the display, to provide information related to the available local radio station 104 and/or the list of available radio content from the VES server 102.

Using one or more of the interface devices 304, the user selects the desired radio station and the radio request generator 322 is configured to provide a radio content request requesting radio content from an identified radio station, where the identified radio station is the desired radio station selected by the user. The radio content request is transmitted to the VES server 102 via the communication system 300. The radio content request may include additional information such as, but not limited, to location of the enhanced vehicle system 100, identification information associated with the enhanced vehicle system 100, and/or time stamp of the request.

As detailed above, the VES server 102 is configured to review the radio content request and provide the radio content for the identified radio station if it is available. Through the communication system 300, the radio content manager 344 obtains the radio content from VES server 102 and emits or plays the radio content via speakers in the enhanced vehicle system 100. The radio content manager 344 may temporarily store the radio content in a cache to provide buffering and time-shifted playback to provide the user the option to listen to the radio content behind the real-time and not necessarily in real-time.

In the event that the radio content is not available, the radio content manager 344 is configured to provide a notification indicating the unavailability of the radio content from the desired radio station.

The VES server 102 is configured to provide the radio content for the identified radio station to the enhanced device as long as the radio content is available and/or the enhanced vehicle system 100 no longer requests the radio content. In a non-limiting example, the user may deselect the desired radio station by: selecting an OFF button for the infotainment system 302 via, for example, one or more of the audio features of the infotainment system 302; selecting another audio source (e.g., BLUETOOTH device, FM tuner, among others); turning off the enhanced vehicle system 100; and/or selecting another AM radio station as the desired radio station. If another AM radio station is selected, the radio request generator 322 provides a new radio content request to the VES server 102. On the other hand, if the user changes the audio source or selects the OFF button for the infotainment system 302, the radio content manager 344 is configured to provide a cancelation notification to the VES server 102 via the communication system 300 to cancel or stop transmission of the radio content.

While not having an AM tuner, the enhanced vehicle system 100 of the present disclosure provides radio content from AM radio stations emitting radio signals at selected AM frequencies using the digital AM radio module and the VES server 102. The digital AM radio module is a single radio access source with AM radio content available from different communication links/channels, such as (cellular, broadcast, and V2X), thereby allow the user to select a radio station from among available stations.

In one form, using vehicle-to-vehicle communication, the enhanced vehicle system 100 may also receive the radio content from the legacy vehicle system 106 that is within communication range of the enhanced vehicle system 100 by broadcasting the radio content request to the VES server 102 and the legacy vehicle system 106.

Figure 4:
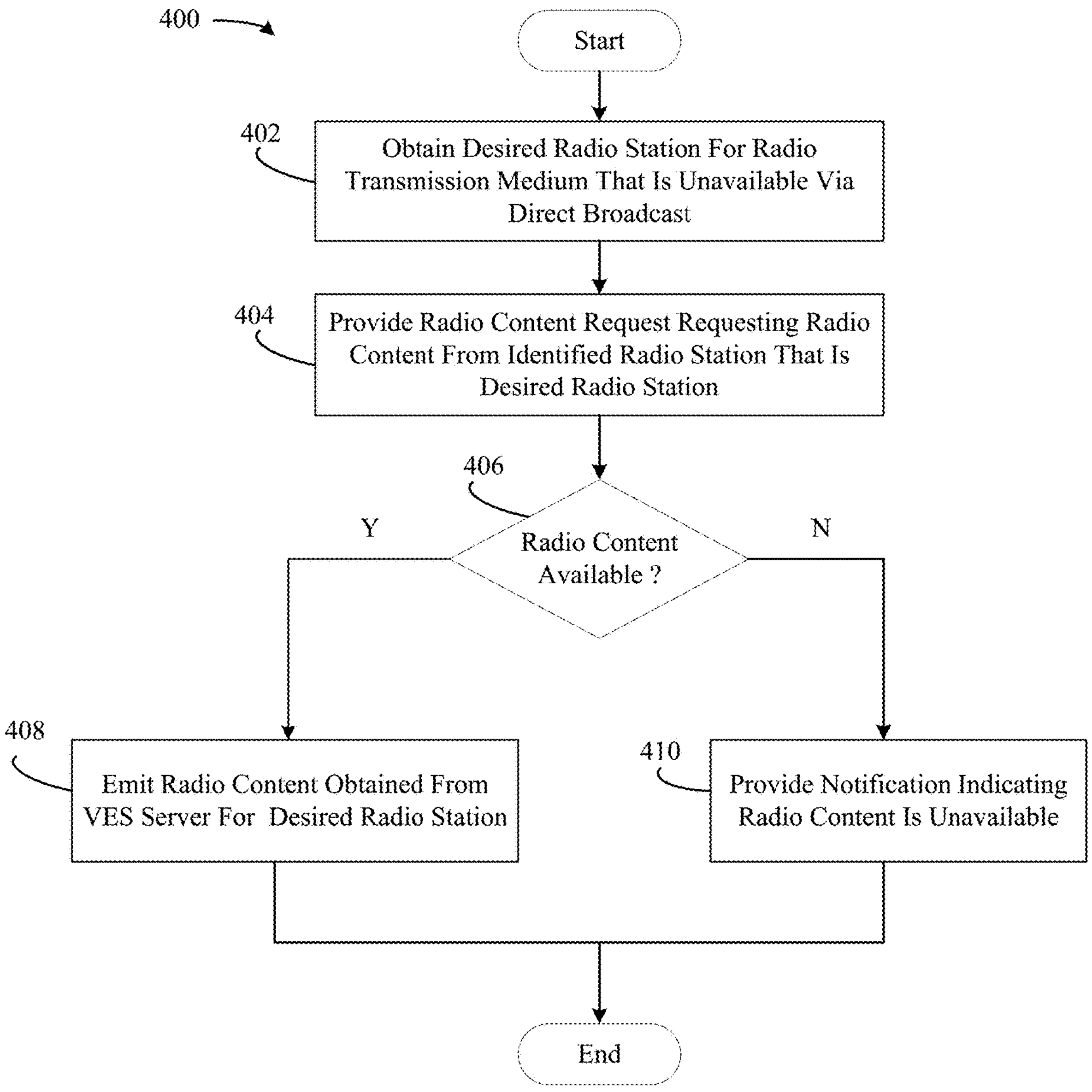
FIG. 4 is a flowchart of an example digital AM radio content request routine in accordance with the present disclosure.

Referring to FIG. 4, a flowchart of an example digital AM radio content request routine 400 performed by the enhanced vehicle system 100 and specifically, the communication system 300 and the infotainment system 302 having the digital AM radio module 105. At 402, the enhanced vehicle system 100 obtains a desired radio station for a radio transmission medium that is unavailable via direct broadcast. That is, the enhanced vehicle system 100 does not include a tuner associated with the radio transmission medium for obtaining the radio content directly from the radio station(s) 104. In a non-limiting example, the radio transmission medium is AM frequency band.

At 404, the enhanced vehicle system 100 provides a radio content request to the VES server 102 requesting radio content from an identified radio station that is the desired radio station. At 406, the enhanced vehicle system 100 determines if the radio content is available. Specifically, in one form, the enhanced vehicle system 100 determines whether the radio content is received from the VES server 102. If it is received, the enhanced vehicle system 100, at 408, emits the radio content obtained from the VES server 102 using speakers in the enhanced vehicle system 100.

If the radio content is not received within a selected time period (e.g., no message after 1 min, 40 secs., etc.) or if the VES server 102 provides a notification indicating that the radio content is unavailable, the enhanced vehicle system 100 provides a notification via one or more interface devices 304 indicating the radio content is not available, at 410.

Figure 5:
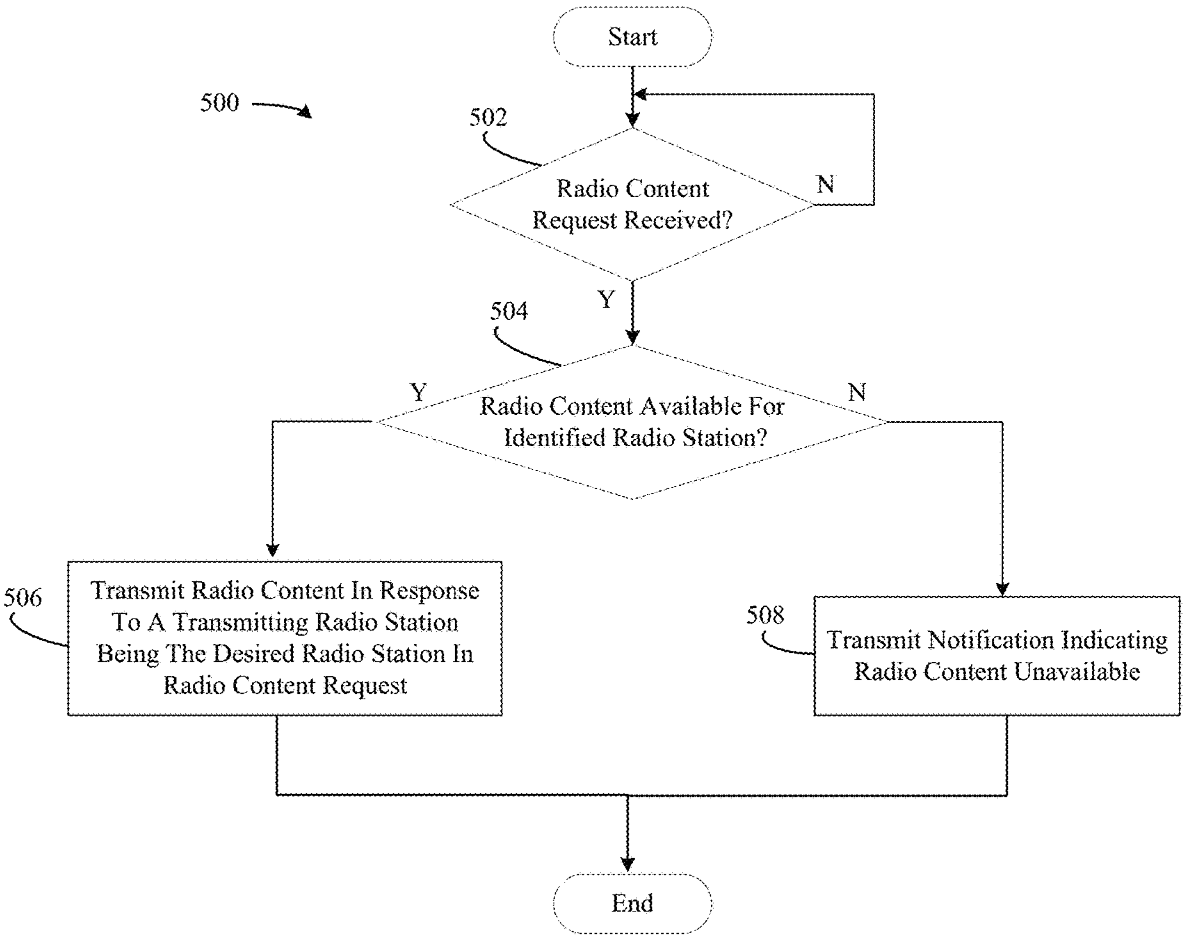
FIG. 5 is a flowchart of an example radio content transmission routine in accordance with the present disclosure.

Referring to FIG. 5, an example radio content transmission routine 500 performed by the VES server 102 is provided. At 502, the VES server 102 determines whether a radio content request is received. If the request is received, the VES server 102 at 504 determines if the radio content is available for the identified radio station provided in the request. Specifically, as provided above, the VES server 102 tracks the radio content originally broadcasted by one or more transmitting radio stations, which may be received from various sources, such as, but not limited to, the legacy vehicle system 106 and transmitting radio station 104 itself. If a transmitting radio station matches the desired radio station in radio content request, the VES Server 102, at 506, transmits the radio content for the desired radio station to the enhanced vehicle system 100. On the other hand, if none of the transmitting radio station match the desired radio station, the VES server 102 transmits a notification indicating that the radio content for the desired radio station is unavailable, at 508.

The enhanced vehicle system 100 having infotainment system 302 with the digital AM radio module 105 may be configured in various suitable ways in accordance with the present disclosure, and should not be limited to the routine 400 of FIG. 4. In a non-limiting example, a routine may include operations for determining whether the radio content for the desired radio station is still desired by the user. In another example, the routine may be modified to have the VES server 102 issue a notification to various radio content sources, such as legacy vehicle systems 106, to see if the legacy vehicle system is obtaining the radio content for the desired radio station.

Similarly, the VES server 102 may be configured in various suitable ways in accordance with the present disclosure, and should not be limited to the routine 500 of FIG. 5 for providing the radio content. In a non-limiting example, a routine may include operations for requesting the radio content of the desired radio station if the radio content is not currently being received.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

In this application, the term “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean “at least one of A, at least one of B, and at least one of C.”

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for providing radio content to a vehicle, comprising:

a vehicle system for the vehicle including:

a vehicle communication system including at least one tuner, wherein the at least one tuner is unresponsive to amplitude modulation (AM) radio frequency band and is configured to transmit a radio content request requesting radio content from a desired radio station broadcasting in the AM radio frequency band;

a vehicle infotainment system including one or more-processors and a memory storing programming instructions that are configured to cause the one or more processors to:

obtain an input identifying the desired radio station broadcasting in the AM radio frequency band, and emit radio content from the desired radio station via one or more speakers of the vehicle; and a vehicle entertainment support server remote from the vehicle and including one or more staging memories, the vehicle entertainment support server being configured to:

receive a plurality of available radio content being broadcasted from a plurality of radio stations, at least one available radio content is broadcasted in the AM radio frequency band, store the plurality of available radio content in the one or more staging memories, obtain the radio content request; and transmit an identified radio content broadcasted from an identified radio station in response to the identified radio station being the desired radio station, the plurality of available radio content including the identified radio content and the plurality of radio stations including the identified radio station, wherein the identified radio content is emitted by the vehicle infotainment system as the radio content.

2. The system of claim 1, wherein the at least one tuner is configured to receive data from at least one of a frequency modulation (FM) radio station, a global navigation satellite system (GNSS), and/or a cellular network.

3. The system of claim 1, wherein the vehicle entertainment support server is configured to receive a relayed radio content from a second vehicle having a tuner responsive to the AM radio frequency band for receiving the relayed radio content from a radio station among the plurality of radio stations, and store the relayed radio content as one of the plurality of available radio content.

4. The system of claim 1, wherein the vehicle entertainment support server is configured to receive at least one of the plurality of available radio content directly from the radio station originally broadcasting the radio content.

5. The system of claim 4, wherein the radio content is received as an analog radio signal, and the vehicle entertainment support server is configured to convert the analog radio signal to a digital file of the radio content.

6. The system of claim 1, wherein:

the vehicle entertainment support server is configured transmit information providing a list of available radio content; and the vehicle infotainment system is configured to provide information indicative of the list of available radio content, wherein the desired radio station is selected from among the list of available radio content.

7. A method for providing radio content to a vehicle, comprising:

obtaining, by a vehicle infotainment system at a vehicle, an input identifying a desired radio station broadcasting in an amplitude modulation (AM) radio frequency band;

transmitting, by a vehicle communication system of the vehicle, a radio content request requesting radio content from the desired radio station, wherein the vehicle communication system includes at least one tuner, wherein the at least one tuner is unresponsive to the AM radio frequency band;

obtaining, by a vehicle entertainment support server remote from the vehicle, the radio content request;

receiving, by the vehicle entertainment support server, a plurality of available radio content from a plurality of sources, wherein the plurality of radio content is originally broadcasted in the AM radio frequency band by a plurality of transmitting radio stations;

storing, by the vehicle entertainment support server, the plurality of available radio content in one or more staging memories, wherein the vehicle entertainment support server includes the one or more staging memories;

transmitting, by the vehicle entertainment support server, an identified available radio content in response to the desired radio station being one of the plurality of transmitting radio stations, the identified available radio content being associated with the desired radio station; and playing, by the vehicle infotainment system, the identified radio content received from the vehicle entertainment support server using one or more speakers of the vehicle.

8. The method of claim 7, wherein the at least one tuner of the vehicle communication system is configured to receive data from at least one of a frequency modulation (FM) radio station, a global navigation satellite system (GNSS), and/or a cellular network.

9. The method of claim 7, further comprising communicating, by the vehicle entertainment support server, with a second vehicle to receive a relayed radio content, and storing the relayed radio content as an available radio content among the plurality of available radio content, wherein the second vehicle is a source among the plurality of sources.

10. The method of claim 7, further comprising communicating, by the vehicle entertainment support server, with a radio station broadcasting the radio content, wherein the radio station is a source among the plurality of sources.

11. The method of claim 10, wherein:

the radio content is received as an analog radio signal, and the method further comprises converting, by the vehicle entertainment support server the analog radio signal to a digital file of the radio content.

12. The method of claim 7, wherein:

the method further comprises:

transmitting, by the vehicle entertainment support server, information providing a list of available radio content and the radio stations broadcasting; and providing, by the vehicle infotainment system, information indicative of the list of available radio content, wherein the desired radio station is selected from among the list of available radio content.

13. A system for providing radio content to a vehicle, comprising:

a vehicle system, for the vehicle, including:

a vehicle communication system including at least one tuner, wherein each tuner is unresponsive to radio transmission provided in amplitude modulation (AM) radio frequency band and is configured to transmit a radio content request requesting radio content broadcasted from an identified radio station in the AM radio frequency band; and a vehicle infotainment system including one or more processors and a memory storing programming instructions that are configured to cause the one or more processors to obtain an input identifying a desired radio station broadcasting in the AM frequency band, wherein the identified radio station of the radio content request is the desired radio station; and a vehicle entertainment support server remote from the vehicle and including one or more staging memories, the vehicle entertainment support server being configured to:

receive available radio content from a source, wherein the available radio content is originally broadcasted in the AM frequency band by a transmitting radio station;

store the available radio content in a selected staging memory from among the one or more staging memories;

obtain the radio content request from the vehicle communication system; and transmit the available radio content in the selected staging memory to the vehicle communication system of the vehicle in response to the transmitting radio station being the desired radio station provided in the radio content request, wherein:

the instructions further cause the one or more processors of the vehicle infotainment system to play the available radio content received from the vehicle entertainment support server via one or more speakers of the vehicle.

14. The system of claim 13, wherein the at least one tuner is configured to receive data from at least one of a frequency modulation (FM) radio station, a global navigation satellite system (GNSS), and/or a cellular network.

15. The system of claim 13, wherein the vehicle entertainment support server is configured to receive the available radio content from a second vehicle having a tuner responsive to AM frequency band and capturing the available radio content from the transmitting radio station, wherein the source includes the second vehicle.

16. The system of claim 13, wherein the vehicle entertainment support server is configured to receive with the available radio content directly from the transmitting radio station, wherein the transmitting radio station is the source.

17. The system of claim 16, wherein the available radio content is received as an analog radio signal, and the vehicle entertainment support server is configured to convert the analog radio signal to a digital file of the radio content.

18. The system of claim 13, wherein:

the vehicle entertainment support server is configured to receive a plurality of the available radio content broadcasted from a plurality of radio stations, store the plurality of the available radio content in the one or more staging memories, and transmit information providing a list of the available radio content and associated radio station among the plurality of radio stations; and the instructions further cause the one or more processors of the vehicle infotainment system is to provide information indicative of the list of available radio content, wherein the desired radio station is selected from among the list of available radio content and associated radio station among the plurality of radio stations.

* * * * *